Nov. 17, 1931.  J. H. ASHBAUGH ET AL  1,832,610
REGULATOR SYSTEM
Filed March 17, 1930
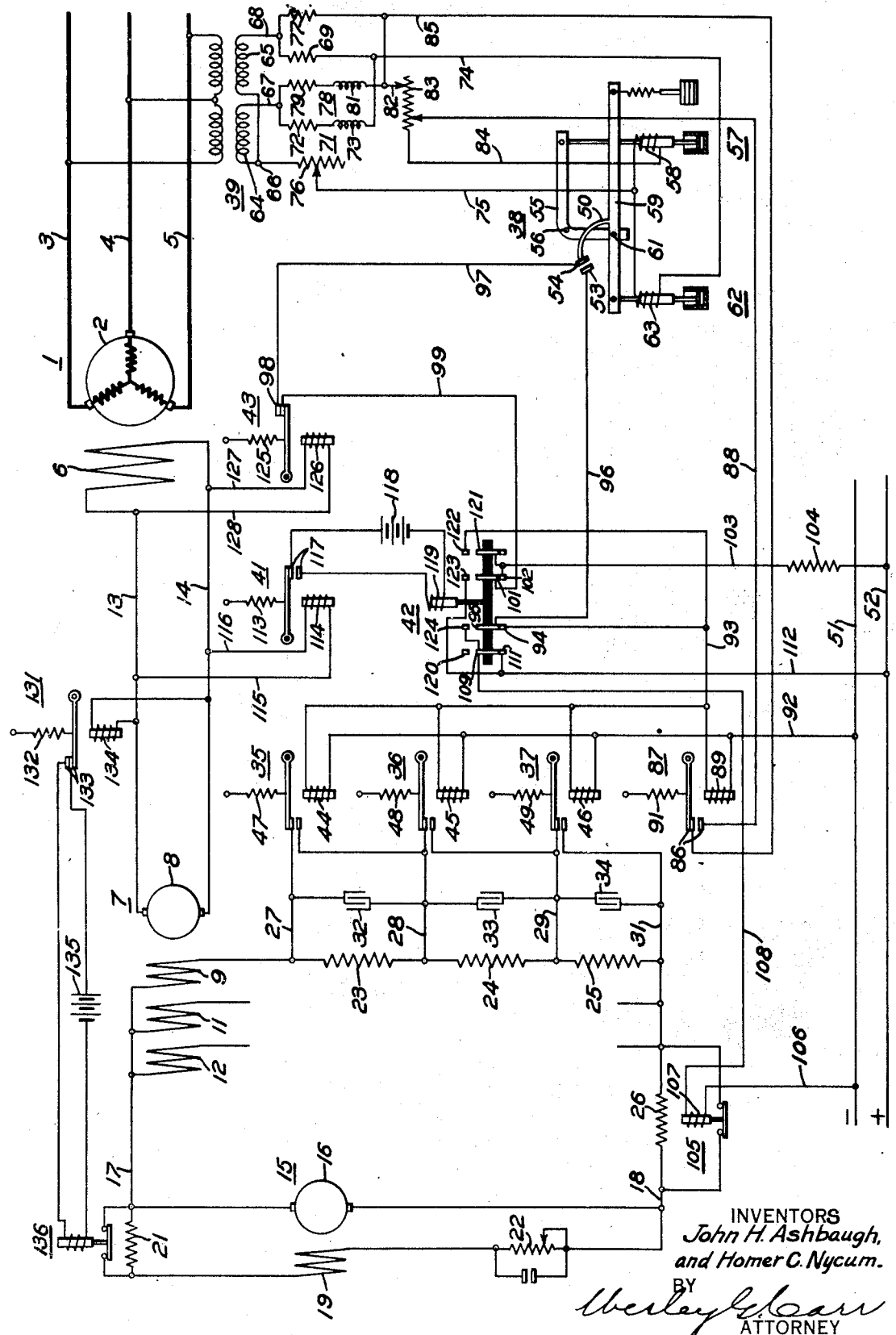
INVENTORS
John H. Ashbaugh,
and Homer C. Nycum.
BY
Wesley G. Carr
ATTORNEY Patented Nov. 17, 1931

1,832,610

UNITED STATES PATENT OFFICE

JOHN H. ASHBAUGH, OF PITTSBURGH, AND HOMER C. NYCUM, OF WILKINSBURG, PENNSYLVANIA, ASSIGNORS TO WESTINGHOUSE ELECTRIC AND MANUFACTURING COMPANY, A CORPORATION OF PENNSYLVANIA

REGULATOR SYSTEM

Application filed March 17, 1930. Serial No. 436,433.

Our invention relates to regulator systems and more particularly to systems wherein high speed excitation is desired for quickly varying the excitation of a dynamo-electric machine.

In applying our invention, we make use of the vibrating type of regulator wherein a resistor, or a plurality of resistors, are connected in circuit with the field winding of a dynamo-electric machine, and the effective values of the resistors are varied by means of shunting relays actuated in accordance with the operation of the vibrating regulator. As the percentage of time that the regulator contact members are in engagement increases, the effective value of the shunted resistor decreases, and the current flowing through the field winding circuit correspondingly increases.

The regulating resistors provided are of sufficient regulating capacity to vary the excitation of the dynamo-electric machine throughout its normal range of excitation, and to a value considerably above the excitation usually required, in order that, upon the proper operation of the regulator, the excitation may be increased rapidly.

If the voltage of a generator supplying current to a power circuit drops materially below its desired value, as the result, for example, of a fault upon the power circuit, the condition of the power circuit may be such that the voltage of the generator cannot be brought back to its full value without so greatly increasing the excitation thereof, as to cause a dangerous increase in the voltage of the generator when the power circuit fault has been cleared. In order to provide for a rapid increase in the voltage of the generator, it is desirable to provide a regulator system capable of increasing the voltage output of the generator to a maximum value considerably above the capacity required to develop the ceiling or maximum desired voltage.

It is an object of our invention to provide a regulator system that is accurate and quick in its response to the regulator, and in which means is provided for limiting the maximum excitation that may be applied to the regulated machine.

Our invention will be better understood by reference to the accompanying drawing in which the single figure is a diagrammatic view of apparatus and circuits organized in accordance with our invention.

Referring to the drawing, a generator 1 is shown having an armature winding 2 that is connected to the power circuit conductors 3, 4 and 5, and a field winding 6. An exciter generator 7 is provided for energizing the field winding 6, and comprises an armature winding 8 and a plurality of field windings 9, 11 and 12 which may be connected in parallel circuit relation to each other. The complete circuit of one only of the field windings is illustrated in the drawing.

The armature winding 8 of the exciter generator is connected to the field winding 6 by means of the conductors 13 and 14, and the field windings 9, 11 and 12 are connected to be energized from a suitable source of direct current energy such as the generator 15, which comprises an armature winding 16 that is connected to the supply conductors 17 and 18, and with a field winding 19 shown connected to the supply conductors 17 and 18 through regulating resistors 21 and 22. Each of the field windings 9, 11 and 12 are connected between supply conductors 17 and 18 through regulating resistors 23, 24 and 25, and the normally short circuited resistor 26. Conductors 27, 28, 29 and 31 are provided for connecting the resistor sections 23, 24 and 25 in shunt relation to the condensers 32, 33 and 34, respectively, and to the contact members of the regulator relays 35, 36 and 37, respectively.

The relays 35, 36 and 37 are actuated to close circuits in shunt relation to the resistors 23, 24 and 25, to vary the effective value thereof in accordance with the operation of the vibrating regulator 38, that is energized through the positive phase sequence network 39 in accordance with the voltage of the power circuit 3, 4, 5. A transfer relay 42, that is controlled by the relay 41, is provided for interrupting the circuit between the regulator 38 and the relays 35, 36 and 37 upon a predetermined voltage being impressed upon field winding 6, and for placing the contactor 105 under the control of a regulating relay 43 that is effective to regulate for a predetermined voltage across the field winding 6 under certain power circuit conditions.

The relays 35, 36 and 37 are provided with electromagnets having operating windings 44, 45 and 46, respectively, for actuating the relays armature to their circuit closing positions against the pull of the spring members 47, 48 and 49, respectively, when energized from the supply circuit conductors 51 and 52 upon engagement of the regulator contact members 53 and 54. The regulator 38 comprises a bell crank lever 55 that is mounted on a fixed pivot 56 and actuated by the electromagnet 57, that is energized by a winding 58 and a lever 59, that is mounted upon the pivot 61 carried by the lower end of the bell crank 55 and actuated by the electromagnet 62 that is energized by the winding 63.

The movable contact member 54 is carried by an extension 50 of the lever 59 and is actuated to be brought into engagement with and to be disengaged from the fixed contact member 53 in a well-known manner. The regulator windings 63 and 58 are energized through the phase-sequence network 39 which comprises two voltage transformers having their primary windings connected in open delta to the power circuit conductors 3, 4 and 5, and their secondary windings 64 and 65 connected together at a common point 66 with their opposite ends connected to the phases 67 and 68. A phase displacement of substantially 120 degrees will, therefore, exist between the common point 66 and the phases 67 and 68.

The lagging phase 68 is provided with a resistor 69 connected in series relation therewith, and the leading phase 67 is provided with an impedance device 71 connected in series relation therewith and comprising a resistor 72 and an inductive reactor 73. The value of the impedance 71 is the same as that of the resistor 69, as described in a patent to C. T. Allcutt, 1,571,224 granted Feb. 2, 1926, and assigned to the Westinghouse Electric and Manufacturing Company. The circuits of the two phases of the network are joined in the conductor 74 by means of which a circuit is formed through a winding 63 and by means of conductor 75 and regulator resistor 76 to the point 66 of the network. A similar connection of the two phases of the network is provided for the winding 58 between the phases 67 and 68 and the point 66 which comprises a resistor 77 and an impedance device 78, which includes the resistor 79 and the inductive reactor 81. This circuit is completed through the conductor 82, resistor 83, conductor 84, winding 58, conductor 75, resistor 76 to the point 66.

A circuit is provided in shunt relation to the resistor 83 by means of the conductor 85, contact member 86 of the anti-hunting relay 87 and conductor 88. The relay 87 is provided with an electromagnet for actuating the armature thereof, that is energized by the winding 89 which is connected in parallel circuit relation with the windings 44, 45 and 46 and controlled by the regulator 38.

During the normal operation of the regulator 38, engagement of the contact members 54 and 53 close a circuit from the supply conductor 51 through the conductor 92 to the operating windings of the group of relays 35, 36, 37 and 87, through conductor 93, contact members 94 and 95 of the relays 42, conductor 96, regulator contact members 53 and 54, conductor 97, contact members 98 of the regulating relay 43, conductor 99, contact members 101 and 102 of the relay 42, conductor 103, and resistor 104 to the supply conductor 52. The contactor 105 is, in the illustrated position of the relay 42, normally held in a circuit-closed position by a circuit leading from the supply circuit 51 by the conductor 106, through the operating winding 107 of the relay 105, the conductor 108, contactor members 109 and 111 of the relay 42, and conductor 112 to the supply conductor 52.

The relay 41 is provided with a biasing member 113 and an electromagnet having a winding 114 that is connected by means of conductors 115 and 116 to the field circuit conductors 13 and 14. Upon a predetermined energization of the winding 114, the relay contact members 117 are brought into engagement and close a circuit from the battery 118 through the winding 119 of the relay 42, thus actuating the movable relay contact members 109, 95, 101 and 121 to their upper positions, engaging the contact members 120, 124, 123 and 122, respectively.

The regulating relay 43 is provided with a biasing means 125 for actuating the armature of the relay to a position to cause engagement of the contact members 98, and with an electromagnet for causing disengagement of the contact members. The electromagnet is provided with a winding 126 that is connected by means of conductors 127 and 128 to the conductors 13 and 14 supplying the field winding 6. A relay 131 may also be provided having an armature normally held upwardly by the biasing means 132 to cause engagement of the contact members 133 and provided with an electromagnet having a winding 134 for actuating the armature to cause disengagement of the contact members 133 upon a predetermined voltage across the field conductors 13—14. In the illustrated position of the relay 131, a circuit is closed from the battery 135 through the winding of a contactor 136 which is held in a circuit closing position for completing a circuit in shunt relation to the resistor 21.

The operation of the system is as follows:

The regulator 38 is energized through the network 39 in accordance with the positive phase sequence voltage of the power line 3—4—5. If the voltage of the power line decreases the energization of the regulator windings 63 and 58 decreases permitting the cores of the electromagnets 62 and 57 to drop, the pivot 61 moving in a clockwise direction about the pivot 56 and the contact member 54 moving in a counter-clockwise direction about the pivot 61, thus causing engagement of the contact members 53 and 54, thus completing the circuit previously traced for actuating the relays 35, 36, 37 and 87 to their circuit closed positions. The relays 35, 36 and 37 thus close circuits in shunt relation to the resistors 23, 24 and 25 causing an increase in the energization of the exciter generator 7 and of the field winding 6 of the main machine. The relay 87 closes a circuit in shunt relation to the resistor 83, thus increasing the energization of the winding 58 causing the electromagnet 57 to be actuated upwardly and effecting disengagement of the contact members 53 and 54 prior to a complete return of the voltage of the main machine to its desired value, thus preventing hunting action in the regulator system. The engagement and disengagement of the contact members 53 and 54 occurs at short intervals, the percentage of time that the contact members are in engagement determining the effective value of the resistors 23, 24 and 25.

The regulator action described above presumes that the machine 1 is operating within its normal voltage and load range under normal power circuit conditions. Under these conditions the voltage applied to the field winding 6 will be comparatively low, such for example, as below 85 volts and the relays 41, 42 and 43 will remain in their illustrated positions. Should a fault occur on the transmission line, such as a short circuit between conductors or an arc to ground from one of the conductors, the voltage of the generator 1 will drop materially below its normal value, thus causing the contact members 53 and 54 to remain in engagement. The relays 35, 36 and 37, therefore, remain closed increasing the voltage applied to the field winding 6 considerably above its normal value. The relay 41 is adjusted to close a circuit through the contact members 117 at some predetermined voltage above that normally applied to the field winding 6, thus causing the energization of the winding 119 and the operation of the transfer relay 42 which occurs in three steps or sequences. The contact member 121 first moves into engagement with the contact member 122. The contact members 95 and 101 next move from engagement with the contact members 94 and 102 into engagement with the contact members 124 and 123, respectively, and the contact member 109 next moves out of engagement with the contact member 111.

The first described step in the operation of the relay 42 closes a circuit from the supply conductor 51 through conductor 92, the windings 44, 45, 46 and 89 of the relays 35, 36, 37, and 87, respectively, through conductor 93, the contact members 122 and 121, conductor 103 and resistor 104 to the supply conductor 52 thus causing the control of the several regulating relays to be taken away from the regulator 38, and the relays to remain in their circuit-closing positions so long as the relay 42 remains in its upper position. The second step interrupts the circuit between the regulator 38 and the windings 44, 45, 46 and 89 of the group of relays and establishes a circuit which leads from the supply conductor 51, through conductor 106, winding 107, conductor 108, contact members 124 and 95 of the relay 42, conductor 96, contact members 53 and 54 of the regulator 38, conductor 97, contact members 98 of the regulating relay 43, conductor 99, contact members 101 and 123 of the relay 42, and by conductor 112 to the supply conductor 52, thus placing the operation of the contactor 105 under control of the regulator 38 and the regulating relay 43. The third step in the operation of the relay 42 is the disengagement of the contact member 109 from the contact member 111 thus interrupting the normally closed circuit for energizing the winding 107 of the contactor 105.

The regulating relay 43 is energized in accordance with the voltage impressed across the field winding 6 and is so adjusted as to operate to open the circuit through the contact members 98 upon a predetermined excitation of the field winding 6. So long as the regulator 38 maintains the contact members 53 and 54 in engagement, the relay 43 will continue to operate intermittently interrupting and closing the circuit through the contact members 98 and operating the contactor 105 to control the effective value of the resistor 26. The excitation of the field winding 6 is thus limited to some ceiling value of excitation beyond which it is undesirable to increase the excitation of the machine 1.

The excitation of the machine 1 is, therefore, prevented from becoming so great that, upon the clearance of the fault on the transmission line, its voltage would rise to a dangerous value before the regulator system would be able to decrease the excitation of the generator.

When the voltage on the power circuit 3—4—5 increases to its normal value, the regulator contact members 53 and 54 will become disengaged and the regulator will continue to operate in its usual manner intermittently closing and opening a circuit through the contact members 53 and 54.

Upon disengagement of the contact members 53 and 54, while the relay 42 is in its upper position, the contactor 105 drops open, thus introducing the resistor 26 in the field winding circuit of the exciter generator 7 and thus decreasing the voltage across the field winding 6. It is necessary that the value of the resistance 26 associated with the contactor 105 be sufficient to reduce the exciter voltage below the value necessary to cause the relay 41 to operate to disengage the contact members 117, thus deenergizing the winding 119 of the relay 42 and permitting it to drop to its lower or illustrated position.

When the winding 119 is deenergized, the movable contact members of the relay 42 are actuated to their lower or illustrated positions in the reverse order from that described above. The contact member 109 first moves into engagement with the contact member 111 thus energizing the winding 107 of the relay 105 and causing it to be actuated to its circuit closing position. The contact members 95 and 101 will next be actuated to disengage the contact members 124 and 123, respectively, and to engage the contact member 94 and 102, respectively, thus restoring the control of the relays 35, 36, 37 and 87 to the regulator 38 upon the disengagement of the contact member 121 from the contact member 122. The several steps in the operation of the relay 42 takes place practically instantaneously, or at very short time intervals in the order of sequence described.

If, upon the occurrence of a fault on a power circuit 3—4—5 and the closing of the regulator contact members 53 and 54, the voltage of the exciter generator 7 rises very rapidly to a value in excess of that which the regulating relay 43 is adjusted to limit, before the circuits controlled by this relay can be established by the relays 41 and 42, the relay 131 will be actuated to cause disengagement of the contact members 133 thus permitting the contactor 136 to drop, introducing the resistor 21 into the field circuit of the generator 15. The relay 131 will be so adjusted as to cause disengagement of its contact members at a higher voltage value than that required to cause disengagement of the contact members 98 of the relay 43.

Since many modifications may be made in the circuits and apparatus described without departing from the spirit of our invention, we do not wish to be limited otherwise than by the scope of the appended claims.

We claim as our invention:

1. In a regulator system, a power circuit, a dynamo-electric machine connected to said power circuit and having a field winding, means for controlling the value of an electrical quantity of said circuit comprising a field winding, a plurality of resistors in circuit with said field winding, a regulator actuated in accordance with the electrical quantity of said circuit for controlling the effective value of certain of said resistors, a regulator actuated in accordance with an electrical quantity of the field winding of said dynamo-electric machine for controlling the effective value of other of said resistors, and a transfer relay actuated in accordance with the voltage across said field winding for selecting one of said regulators for effecting control of said circuit and for effecting a short circuit of the resistors controlled by the other regulator.

2. In a regulator system, a power circuit, a dynamo-electric machine connected to said power circuit and having a field winding, means for controlling the value of an electrical quantity of said circuit comprising a field winding, a plurality of resistors in circuit with said field winding, a regulator actuated in accordance with the electrical quantity of said circuit for controlling the effective value of certain of said resistors, a regulator actuated in accordance with an electrical quantity of the field winding of said dynamo-electric machine for limiting the excitation of said machine, and a transfer relay actuated in accordance with a predetermined voltage across said field winding for selectively short circuiting certain of said resistors and permitting the control of said circuit by the remaining resistors.

3. In a regulator system, a power circuit, a dynamo-electric machine connected to said power circuit and having a field winding, means for regulating the voltage of said circuit comprising a field winding circuit, a plurality of resistors in said circuit, relays for controlling the effective value of said resistors, a regulator actuated in accordance with the voltage of said power circuit and a regulator actuated in accordance with the excitation of the field winding of said dynamo-electric machine, and means for selectively connecting certain of said relays to be actuated by said regulators and for shunting other of said resistors from said field winding circuit.

4. In a regulator system, a power circuit, a dynamo-electric machine connected to said power circuit and having a field winding, means for regulating the voltage of said circuit comprising a field winding circuit, a plurality of resistors in said circuit, relays for controlling the effective value of said resistors, a regulator actuated in accordance with the voltage of said power circuit and a regulator actuated in accordance with the excitation of the field winding of said dynamo-electric machine, a circuit controlled by said regulators for controlling said relays, and a transfer relay actuated in accordance with the voltage across the field winding of said dynamo-electric machine for selectively connecting certain of said relays to be operated from the circuit controlled by said regulators.

5. In a regulator system, a power circuit, a dynamo-electric machine connected to said power circuit and having a field winding, means for regulating the excitation of said machine comprising a field winding circuit, resistor means in said circuit, relay means for controlling the effective value of said resistor, a regulator actuated in accordance with an electrical quantity of said power circuit, and a control circuit controlled thereby for governing the operation of said relay means, a second resistor means in said field winding circuit and contactor means for normally short circuiting said resistor means, a transfer relay actuated upon a predetermined voltage across the field winding of said dynamo-electric machine for effecting a short circuit of said first-named resistor means and for completing a connection from said control circuit to said contactor means for controlling the effective value of said second-named resistor means, and a regulator actuated upon a higher predetermined voltage across said field winding for interrupting said control circuit.

6. In a regulator system, in combination, a dynamo-electric machine, a main exciter generator, and a pilot exciter generator, each of said machines having field windings, the pilot exciter generator being connected to energize the field winding of the main exciter generator, and the main exciter generator being connected to energize the field winding of the dynamo-electric machine, a regulator actuated in accordance with an electrical quantity of said dynamo-electric machine for governing the excitation thereof, means actuated upon a predetermined voltage across the field winding of said dynamo-electric machine for reducing the energization of one of said exciter generators, and means actuated upon a different predetermined voltage across the field winding of said dynamo-electric machine for reducing the energization of the other of said exciter generators.

In testimony whereof, we have hereunto subscribed our names this 5th day of March, 1930.

JOHN H. ASHBAUGH.
HOMER C. NYCUM.